METHOD OF AND MEANS FOR MAKING MAGNETIC RECORDS

Filed Jan. 26, 1948 4 Sheets-Sheet 1

Inventor
MARVIN CAMRAS
by The Firm of Charles W. Hills
Attys.

Feb. 22, 1955 M. CAMRAS 2,702,833

METHOD OF AND MEANS FOR MAKING MAGNETIC RECORDS

Filed Jan. 26, 1948 4 Sheets-Sheet 2

Inventor
MARVIN CAMRAS
by The Firm of Charles W. Hills
Attys.

METHOD OF AND MEANS FOR MAKING MAGNETIC RECORDS

Filed Jan. 26, 1948

Inventor

MARVIN CAMRAS by The Firm of Charles W. Hills

Attys.

METHOD OF AND MEANS FOR MAKING MAGNETIC RECORDS

Filed Jan. 26, 1948 4 Sheets-Sheet 4

Inventor
MARVIN CAMRAS
by The Firm of Charles W. Hills
Attys.

United States Patent Office 2,702,833

Patented Feb. 22, 1955

2,702,833

METHOD OF AND MEANS FOR MAKING MAGNETIC RECORDS

Marvin Camras, Chicago, Ill., assignor to Armour Research Foundation of Illinois Institute of Technology, Chicago, Ill., a corporation of Illinois Application January 26, 1948, Serial No. 4,286

5 Claims. (Cl. 179—100.2)

My invention relates to recording an intelligence on a lengthy magnetizable medium, and more particularly to producing magnetic records for use in magnetic recorders wherein the record medium is moved in one direction during part of the program and in the opposite direction during the remainder of the program.

In one method of reproducing the intelligence on a lengthy magnetizable record medium, the medium is drawn at predetermined linear velocity across one magnetic transducer head during part of the program and at similar linear velocity in the opposite direction over a second magnetic transducer head during the remainder of the program. Each transducer head includes a magnetic core having an air gap positioned to bear against a track extending across part of the medium as it travels thereover, and a coil encircling the core. Since the flux in the core of each head varies in accord with the magnetization of the incremental length thereof positioned over the air gap of that head, and the magnetization of the magnetizable record medium varies along its length in accord with the time variations of the intelligence, a voltage is induced in each head in accord with the time variations of the intelligence. This voltage may be suitably amplified and applied to a loud speaker to reproduce the intelligence.

In another form of magnetic reproducer, a single magnetic transducer head having an air gap extending across only a portion of the magnetizable record medium is used. When the medium has been wound in one direction from a first spool to a second spool to reproduce part of the intelligence, the spools are removed from the unit and reversed, thereby causing the medium to travel in the opposite direction to reproduce the remainder of the intelligence.

Apparatus for and methods of magnetic recording and reproducing in accord with the foregoing description are described and claimed in my copending applications, Serial No. 690,877, now Patent No. 2,549,771, entitled "Magnetic Transducer Head," filed August 16, 1946, assigned to the same assignee as the present invention.

In magnetic reproducers of the foregoing type, it is necessary to have a record medium having two spaced channels, one channel having variations in magnetization along its length in accord with the time variation of part of the intelligence recorded and the other channel having variations in the degree of magnetization along its length in reverse order of the remaining portions of the intelligence. In accordance with the present invention, improved methods of and apparatus for recording intelligence on magnetic record mediums of this type are provided.

It is a general object of the present invention to provide improved methods of and means for producing a plurality of magnetic record mediums.

A more specific object of the present invention is to provide an improved method of a means for recording intelligence on a magnetic record medium of the type intended for use in reproducers operable with the medium traveling in one direction during part of the program and in the opposite direction during the remainder of the program.

Further, it is an object of the present invention to provide an improved method of and means for recording intelligence on a magnetizable record medium having spaced channels to be moved in opposite directions over a magnetic transducer head during reproduction.

Further, it is an object of the present invention to provide methods of and means for simultaneously producing a large number of magnetic record members of the type intended for use in a magnetic reproducer operable with the medium traveling in one direction during part of the program and in the opposite direction during the remainder of the program.

It is still another object of the present invention to provide an improved mechanism for simultaneously recording intelligence on a plurality of magnetic records for use in magnetic reproducers of the type operable with a medium traveling in one direction during part of the program and in the opposite direction during the remainder of the program and which is continuously operable to achieve constant production of record medium.

Further it is an object of the present invention to provide a continuously operative mechanism for making magnetic records.

It is still another object of the present invention to provide a mechanism operable continuously to make magnetic records and in which an automatic monitoring mechanism is provided to indicate the quality of the records after they are made.

Still another object of the present invention is to provide an improved mechanism for holding a lengthy record member against a plurality of spaced electromagnetic transducer head assemblies.

My invention further resides in features of construction, combination and arrangement whereby improved mechanisms and methods are provided for recording on magnetic record mediums of the type intended for use in apparatus wherein the medium is caused to travel in one direction during part of the program and in the opposite direction during the remainder of the program.

The novel features which I believe to be characteristic of my invention are set forth with particularity in the appended claims. My invention itself, however, both as to its organization and method of operation, together with further objects and advantages thereof may be best understood by reference to the following description taken in connection with the accompanying drawings, in which:

As shown on the drawings.

Figure 1:
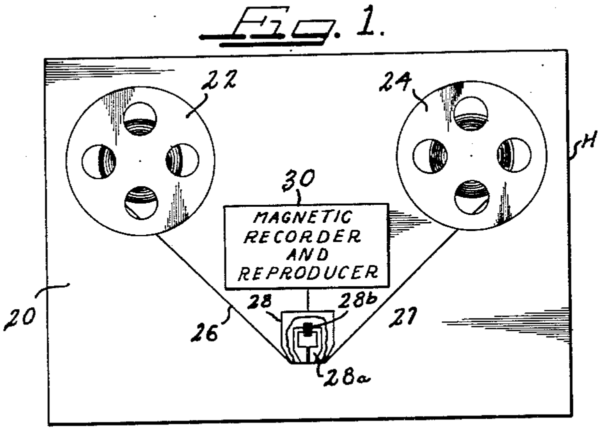
Figure 1 is a diagrammatic top plan view of a magnetic reproducer of the type to which records made in accord with the present invention are applicable.

Figure 1 is a top plan view showing an illustrative magnetic reproducer of the type to which a medium produced in accord with the principles of the present invention is applicable. This unit is also operable to produce a master record for use in the apparatus of the present invention. This unit includes a housing H having a panel 20 over which are supported spaced reels 22 and 24. A lengthy magnetizable record medium 26 is wound about these reels and extends therebetween, and the head 28 is mounted to engage this medium in the region between the reels. As indicated diagrammatically in Figure 1, the head 28 is electrically connected to a magnetic recorder and reproducing unit 30.

The lengthy magnetizable record medium 26 may, for example, consist of a lengthy tape of paper, plastic, or similar material, bearing a coating of magnetizable particles on one side thereof. As indicated by the broken-away portions of the housing of the head 28, that head includes a U-shaped magnetic core **28*a* having confronting pole pieces defining a narrow air gap over which the medium 26 rides and having a coil 28*b* encircling the core 28*a* to produce flux in core 28*a* upon current flow therethrough and to cause an induced voltage determined by the time rate of change of magnetic flux in the core 28*a***.

During recording, an intelligence such as, for example, sound, is converted by the magnetic recorder and reproducer 30 to a time varying voltage which is applied to the coil **28*b* to cause a time varying magnetic field across the confronting pole pieces of the core 28*a* in accord with the time variations of the intelligence. Movement is imparted to medium 26 by the rotational movements of the reels 22 and 24 to cause that medium to travel over the confronting pole pieces of the core 28*a* and to partake of the magnetic field as it fringes about the air gap defined thereby. As the medium 26 travels over the head 28, incremental lengths thereof are magnetized in accord with the instantaneous value of the current flow through coil 28*b* at the time these incremental lengths travel over the air gap portions of the core 28*a*. Thus, the medium 26** is magnetized along its length in accord with the time variations of the intelligence.

To reproduce the intelligence corresponding to the variations of the magnetization of medium 26, the medium is caused to travel between the reels 22 and 24 in the same direction as it previously traveled during the recording operation. As each incremental length of the medium 26 travels over the air gap between the confronting pole piece portions of the core **28*a*, the flux in that core varies in accord with the degree of magnetization of that incremental length, thereby causing the flux in the core 28*a* to vary in accord with the variations in magnetization of medium 26 and generating a time varying voltage in the coil 28*b*. This voltage is applied to the magnetic recorder and reproducer 30** and is therein amplified and converted to its original form as, for example, sound.

Figure 2:
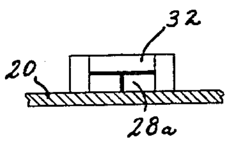
Figure 2 is a front elevational view of an electromagnetic transducer head suitable for use in the reproducer of Figure 1.

In order to obtain maximum utilization of the lengthy magnetizable record medium 26 as well as to avoid the need for rewinding the medium 26 from the spool 24 to the spool 22 after the intelligence thereon has been reproduced, it is desirable to provide a mechanism whereby only a part of the magnetizable width of the medium 26 is utilized as that medium travels from reel 22 to reel 24, and the remainder of the useful portion of the medium is utilized when the medium is rewound from reel 24 to reel 22. In one method of accomplishing this result, the core portion **28*a* of the head 28 is made slightly less than half the width of the tape 26, as indicated in the view of Figure 2. In addition, a soft iron keeper member 32 is disposed over the core 28, particularly in the region of the air gap formed by the confronting pole pieces thereof to prevent fringing fluxes from the core 28*a* to the upper portion of the record medium 26**.

With a head such as that indicated in Figure 2, the medium 26 is first caused to travel in one direction as, for example, from reel 22 to reel 24, and the intelligence being recorded on the bottom half thereof, the keeper 32 preventing any recording on the top half thereof. When the tape is completetly wound on the reel 24, the positions of reels 22 and 24 are reversed, and the tape is then rewound from the reel 24 to the reel 22, passing over the head 28 in the same direction relative to panel 20 but in the opposite direction relative to medium 26. During this time, however, the portion of the medium 26 which constituted the bottom half during the first winding operation now comprises the top half and rests only against the keeper 32 whereas the other portion of the tape rides against the head 28 and receives the remaining portions of the intelligence.

During reproduction, the foregoing process is repeated, the bottom half of the tape being used during the first portion of the reproduction and the top half of the tape being used during the remainder thereof.

It will be observed from the foregoing description that the portion of the tape constituting the beginning of the intelligence during one-half of the recording constitutes the end during the other half. In other words, the magnetization along the length of the medium is varied in accord with time variations of the intelligence on one-half of the medium and in accord with reverse order of the time variations of the intelligence along the other half of the medium.

There is a need for inexpensive magnetic record members with intelligence already recorded thereon. In the case of high grade musical selections, for example, the intelligence may be recorded by experts under ideal conditions to obtain a maximum fidelity of recording and thereby assuring a better product than can be made by amateurs on a machine intended for home use. Moreover, the user of the recorder is not required to spend the time and effort necessary actually to record the intelligence himself. In producing such records, however, it is highly desirable that they be produced in a continuous process in a more efficient manner than would be possible by using the recorder indicated in Figures 1 and 2. Moreover, it is desirable to produce a large number of separate recorded mediums simultaneously, to the end that the cost of production of each medium be minimized. It is the purpose of the present invention to provide a method of and means for accomplishing these ends.

Figure 3:
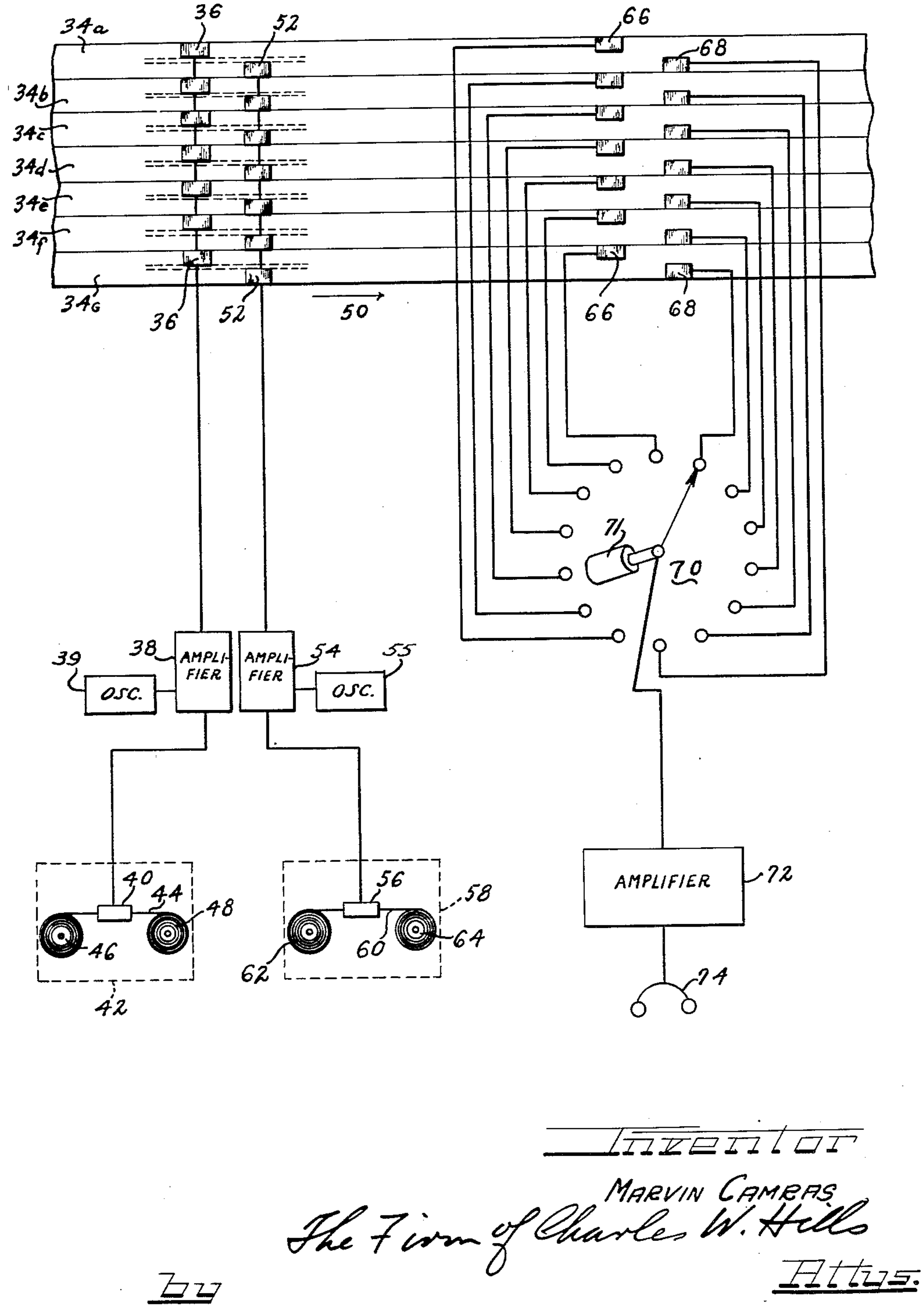
Figure 3 is a somewhat diagrammatic top plan view showing a mechanism for continuously recording intelligence on a plurality of magnetic record mediums in accord with the principles of the present invention.

In the apparatus of Figure 3, a total of seven separate recording mediums are produced simultaneously from as many strips of magnetizable record medium indicated at **34*a* to 34*g***, inclusive. As indicated by the dotted lines of Figure 3, each strip is further subdivided into a pair of parallel spaced sub-tracks which form the two separate spaced portions of each medium and which are acted upon by a separate electromagnetic transducer head.

Figures 4, 9:
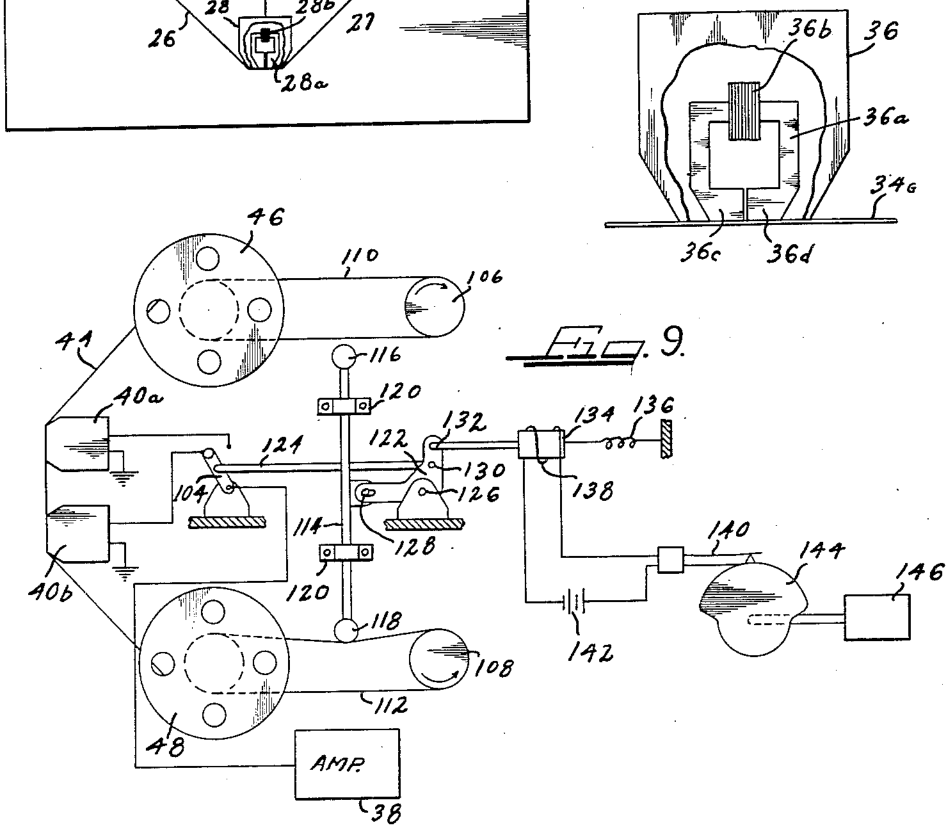
Figure 4 is a broken-away side elevational view of an electromagnetic transducer head of the type suitable for use in the apparatus of Figure 3.
Figure 9 is a diagrammatic view showing one reproducing mechanism suitable for use in the apparatus of the present invention.

The construction of the electromagnetic transducer heads 36, 52, 66 and 68, which ride on the separate channels of the tapes **34*a* to 34*g*, is shown best in the broken-away side elevational view of Figure 4 which shows the forward recording head 36 that rides against the strip 34*g*. As indicated, this head includes a magnetizable core portion 36*a* having confronting pole pieces 36*c* and 36*d* which define an air gap across which the medium 34*g* passes. A coil 36*b*** encircles this core portion to create a magnetic field across the air gap in accord with the current flow therethrough.

The air gap of head 36, as well as the air gaps of the other electromagnetic transducer heads referred to herein, may be, of course, filled with solder or other substance of low magnetic permeability.

It is the function of the forward recording heads 36 to impart variations in magnetization along the length of one track on each of the tapes **34*a* to 34*g* in accord with the time variations of one portion of the recorded intelligence. To this end, the coils 36*b* of these heads are all connected to the amplifier 38 which is in turn electrically connected to the electromagnetic transducer head 40 on the mechanism 42. The head 40** is constructed like the head of Figure 4 to produce a time varying electromotive force as the lengthy magnetizable record medium 44 is drawn thereover. This time varying electromotive force is amplified in the amplifier 38 and applied to the heads 36 to create time varying magnetomotive forces across the air gap portions thereof and impart variations in magnetization along the length of the medium 34 in accord with the variations of magnetization along the length of the magnetizable record medium 44.

The medium 44 is mounted upon reels 46 and 48, and these reels are rotated to cause the medium 44 to travel across the head 40. Simultaneously, movement in the direction of the arrow 50 is imparted to the medium 34 to cause that medium to travel across the air gap of the head 36.

It is the function of the reverse heads 52 of the other tracks of the tapes to impart variations in magnetization along the length of strips 34*a* to 34*g* in reverse order of the time variations of the intelligence to be recorded thereon. To this end, each of the heads 52 is constructed in similar fashion to the head 36 with a core portion having an air gap across which the medium 34 rides. The coil portions of these heads are connected to the amplifier 54 which receives a time varying electromotive force from the head 56. The head 56, in turn is mounted on the reproducer 58, which reproducer includes a magnetized record medium 60 which is wound about the reels 62 and 64.

The medium 60 is magnetized along its length in accord with the intelligence to be recorded on the tracks of strips 34*a* to 34*g*. As this medium is caused to travel between the reels 62 and 64, a time varying voltage is induced in the head 56, which voltage is applied to amplifier 54 and to the coil portions of the heads 52 to cause a time varying magnetomotive force across the air gap thereof in accord with the time variations in the voltage induced in head 56. This imparts variations in magnetization of the medium 34 as it travels over the head 52, as indicated in the arrow 50, thereby imparting variations in the magnetization of the medium 34 in accord with the variations in the magnetization of the medium 60.

The reverse heads 52 are subjected to a current flow varying with time in reverse order to the intelligence desired to be reproduced upon use of the medium produced thereby. To this end, the magnetized record medium 60 is moved in reverse direction across the head 56, thereby causing a time varying electromotive force to be induced in the head 56 in reverse order of the intelligence to be recorded.

While the units 38 and 54 are shown diagrammatically as amplifiers in Figure 3, it will be understood that they preferably include filter networks, level control mechanisms, and the like, to provide a maximum degree of fidelity of recording on the strips 34*a* to 34*g*.

High frequency oscillators 39 and 55 feed high frequency voltage into the amplifiers 38 and 54, which high frequency voltage is applied to the electromagnetic transducer heads 36 and 52, respectively, thereby providing suitable high frequency bias to achieve a maximum degree of fidelity in the variations in magnetization imparted along the length of the record medium 34.

The magnetized record mediums 44 and 60 act as master records from which the medium 34 is magnetized. These records may be made in any one of various methods. One way of making them, for example, would be to use a magnetic recording mechanism such as that shown in Figures 1 and 2 and to slit the resultant recorded medium along its length after it is produced. One-half of the medium would then be used as medium 44 and the other half of the medium used as medium 60, these two halves of the medium being moved in corresponding directions across the heads 40 and 56 so that the induced voltage in the head 40 is in accord with the time variations of one part of the intelligence and the induced voltage in the head 56 in accord with the reverse time variations of the other part of the intelligence.

Another way to make the master records 44 and 60 would be to use a recorder wherein the medium travels in a single direction across the head and after recording to cut the medium in two halves, running one half in the normal direction across head 40 and the other half in the reverse direction across the head 56.

It is a function of the electromagnetic transducer heads 66 and 68 to ride on the various tracks of the strips 34*a* to 34*g* to permit monitoring of the degree of magnetization imparted to these tracks. To this end, the pickup coil portions of these heads are connected to the selector switch indicated generally at 70 which is in electric circuit relationship with the amplifier 72 to which the head phones 74 are connected. By noting the intensity and quality of the intelligence reproduced in the head phones 74, the degree of magnetization along the separate tracks may be checked to make certain that high quality recordings are being obtained. Alternatively, a meter may be used to indicate the nature of the output signal from amplifier 72. A motor 71 is attached to switch 70 to achieve automatic rotation thereof and successively connect the heads 66 and 68 to amplifier 72.

It will, of course, be understood to those skilled in the art that, if desired, the medium 34 may be placed in a uniform condition of magnetization along its length prior to recording thereon by the use of a suitable erase mechanism operable on the medium 34 before it rides over the heads 36. Such mechanism may, for example, include a single head extending across the entire width of the strip 34 or a plurality of heads and having their coils energized with a high frequency current to accomplish the desired demagnetization.

Figures 5, 6:
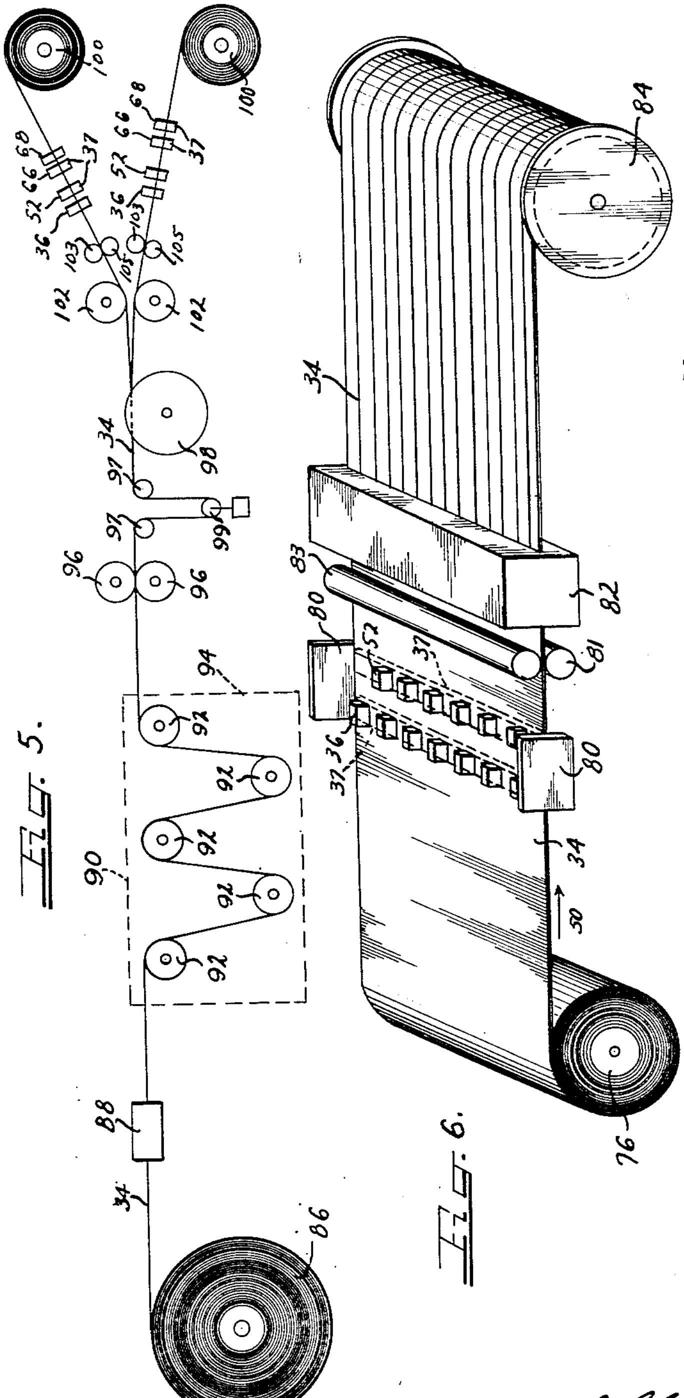
Figure 5 is a diagrammatic side view showing a complete continuously operative mechanism for making a plurality of record mediums in accord with the principles of the present invention.
Figure 6 is an isometric view of another embodiment of the present invention.

In Figure 5 there is shown a diagrammatic side elevational view of a complete mechanism of which the unit of Figure 3 might form a part. A continuous processing of a wide backing tape of paper or the like contained on the reel 86 is achieved to produce a plurality of separate reels of magnetized medium suitable for use in reproducers. As indicated in this view, the raw tape is drawn from the roll 86 and passes through the treating device 88 which applies a coating of an evaporable liquid vehicle containing magnetizable particles on one face thereof. From this unit the medium travels to the drying unit indicated generally at 90 where the liquid vehicle is dried leaving the coating of magnetizable particles thereon. The drier 90 contains, for example, a series of vertically spaced guide rolls 92 disposed within an enclosure indicated diagrammatically at 94 through which heated air or other medium passes to evaporate off the vehicle. Following the drying process, the medium is passed through the calendering rolls 96 which press the surface thereof to a smooth condition. If desired, these may be a series of separate calendering units. Following this step, the wide strip of medium travels to the shear 98 which cuts it into a series of strips equal in width to the desired width of the magnetized record mediums. These strips are then wound upon separate reels 100, being guided thereto by guide wheels 102.

Between the guide wheels 102 and the take-up reels 100, the tape passes across the recording heads 36 and 52 and the monitoring heads 66 and 68. The heads 36 and 52 are energized as described in connection with Figure 3 above to impart magnetization to the separate strips in accord with the desired intelligence.

The capstans 103, Figure 5, coact with the pinch wheels 105 positively to engage the portions of the medium 34 to impart predetermined velocity thereto as the medium travels under heads 36, 52, 66 and 68. The take-up reels 100 are yieldingly rotated to tend to impart rotations thereto of speed in excess of the speed corresponding to the rate at which the capstans 103 release the medium, thereby causing the medium to be maintained taut between the capstans 103 and the reels 100.

The guide pulleys 97 coact with the weighted idler pulley 99 to take up any slack in the medium 34 thus to compensate for any variations in the velocity imparted to the medium along its length.

As indicated diagrammatically in Figure 5, a plurality of friction pads 37 of felt or similar yielding soft material are disposed on the side of the medium 34 opposite the heads 36, 52, 66 and 68 and operates to urge the medium 34 against the pole pieces of these heads. Since the adjacent portions of these pads are capable of deflecting independently of each other, the medium 34 is held against the confronting pole pieces of the heads even though the heads are not in perfect alignment.

The alternate strips 34*a*, 34*c*, 34*e* and 34*g* are wound on the upper reels 100, Figure 5, and the other strips 34*b*, 34*d* and 34*f* are wound on the lower reels. This vertical separation provides suitable space to accommodate the heads 36, 52, 66 and 68 without interference.

There is shown in Figure 6 an isometric view of an alternative embodiment of the present invention. As shown in this view, the medium 34 is unwound from the roll 76 and travels between the guide members 80 which align this medium relative to the forward heads 36 and the reverse heads 52. After passing across the heads 36 and 52, the medium 34 travels through the shear 82 which slices the medium into seven strips, each having two channels upon which the intelligence is recorded. The medium is then reeled upon reels 84 and may be unwound therefrom into separate spools for sale and use.

Figure 7:
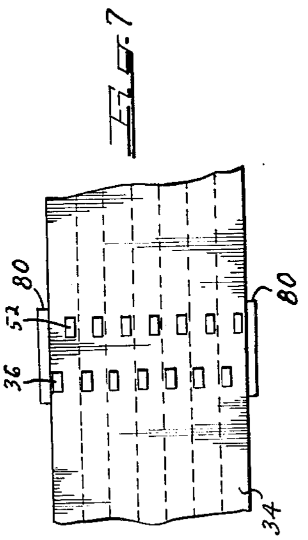
Figure 7 is a fragmentary top plan view showing in further detail the disposition of the electromagnetic transducer heads in the embodiment of the invention shown in Figure 6.

Figure 7 is a top plan view showing the guides 80, Figure 6, together with the heads 36 and 52 located therebetween. The dotted lines of this figure show the boundaries between adjacent strips of medium and along which the shear 82 slices the medium.

The capstan 81, Figure 6, together with the pinch wheel 83, acts to impart a predetermined linear velocity to the medium 34 to withdraw that medium from the reel 76 and to cause predetermined velocity to that medium across the heads 36 and 52. The reel 84 is yieldingly driven by means (not shown) operable to maintain the medium 34 taut in the region between the reel 84 and the capstan 81. Pads 37 of felt or similar material urge the medium 34 against the heads 36 and 52.

Figure 8:
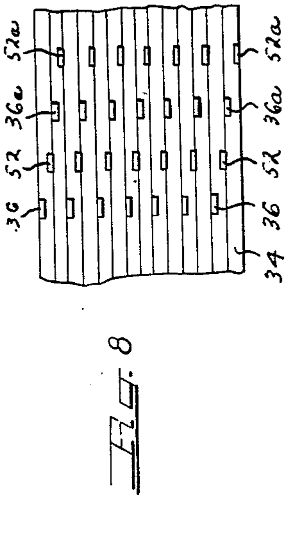
Figure 8 is a fragmentary top plan view of still another embodiment of the present invention.

If the width of each track of the medium 34 is small, as compared to the size of the heads 32 and 52, it may be desirable to space these heads along the length of the medium to avoid physical interference between adjacent heads. An arrangement of this type is shown in Figure 8 where the heads 36 operate on alternate strips of medium 34 and the heads 36*a* act upon the intermediate strips. Similarly, the reverse heads 52 act upon the alternate strips acted upon by heads 36, and the reverse heads 52*a* act upon the intermediate strips associated with the heads 36*a*. It will be observed that in this embodiment of the present invention the heads 36 and 52 and the heads 36*a* and 52*a* are spaced relative to each other in the same manner as heads 36 and 52, Figure 3. Thus, the relative positioning of the backward and forward portions of the recorded medium is not influenced by this arrangement.

It will be evident to those skilled in the art that the reproducers 42 and 58 need not necessarily be magnetic tape type recorders. For example, these may utilize ordinary mechanical record disks, the disk on reproducer 58 having an intelligence recorded thereon in reverse order on one half of the record medium. Moreover, a reversible turntable may be provided if it is desired to use a disk record having intelligence recorded in only one direction.

One of the features of the present invention resides in providing a completely continuous process of producing a plurality of magnetized record mediums. This may be accomplished by arranging the reproducers 42 and 58 to operate continuously, first with the mediums 44 and 60 going in one direction and then the mediums going in the opposite direction, and providing automatic switch elements to energize the amplifiers 38 and 54 as desired. In a structure of this type, the medium 34 may be continuously moved and will continue to receive magnetization as desired.

It will be evident to those skilled in the art that many mechanisms may be employed to cause the reproducers 42 and 58 automatically to produce successive programs as desired without intervening periods of time during which rewinding takes place. In Figure 9, an illustrative mechanism for accomplishing this purpose is shown in diagrammatic form. This mechanism is shown as applied to the reproducer 42, although it will be evident that it may also be applied to the reproducer 58. As indicated in the figure, the medium 44 extends between the reels 46 and 48 and passes over a pair of heads 40*a* and 40*b*.

Figure 10:
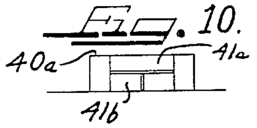
Figures 10 and 11 are front elevational views of the electromagnetic transducer heads used in the apparatus of Figure 9.
Figure 11:
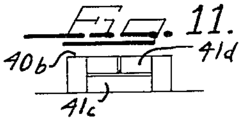

As indicated in Figure 10, the head 40*a* has a keeper 41*a* bearing across the upper portion thereof and a magnet core 41*b* defining an air gap across the lower portion thereof. Hence, this head responds to the intelligence recorded on the lower half of the record medium 44. The construction of head 40*b* is shown in Figure 11. As indicated in this figure, a keeper portion 41*c* extends across the lower portion of this head, and the magnetic core 41*d* having an air gap extending across the upper portion thereof. Hence, this head responds to the intelligence recorded on the upper half of the record medium 44.

The record medium 44 is divided in upper and lower tracks, and the intelligence is recorded thereon in one direction on one track and the other direction on the other track. Thus, by causing the medium first to wind from the reel 46 to reel 48 and then in reverse direction from the reel 48 to the reel 46, there is always one track passing over the heads 40*a* and 40*b* in the proper direction to reproduce the intelligence program.

It is the function of the switch, indicated generally at 104, selectively to connect the amplifier 38 to head 40*a* or head 40*b* in accord with the direction of the travel of medium 44, thereby causing the head operating on the track going in the forward direction to energize the amplifier 38.

The reels 46 and 48 are driven from the drive pulleys 106 and 108, respectively, by means of the belts 110 and 112. The pulleys 106 and 108 are driven in a direction to rotate the reels 46 and 48 in the wind-up or take-up direction, as indicated in Figure 9. The means for accomplishing this purpose may, for example, consist of suitable electric motors (not shown).

It is the function of the shiftable carriage 114 selectively to tension the belts 110 and 112 to drive the reels 46 and 48 in the take-up direction and overcome the take-up torque associated with operation of the opposite pulley. To this end, a pair of guide rollers 116 and 118 are mounted on opposite ends of the member 114, and that member is sustained for shifting axial movements by the bearings 120. Thus, when the member 114 is shifted to engage the belt 112, the reel 48 is rotated in the take-up direction with greater force than is reel 46, and the medium 44 winds from reel 46 to reel 48. When the member 114 is shifted in the opposite direction, the reverse operation takes place.

It is the function of the crank 122 simultaneously to shift the operating arm 124 of the switch 104 and the carriage 114 necessary to accomplish a continuous program. To this end, the crank arm 122 is pivotally supported for rotation about pin 126 and is pivotally connected by pin 128 to the member 114 and by pin 130 to the operating arm 124. In addition, the crank 122 is connected by pin 132 to the plunger 134, which is biased by tension spring 136 to the right as shown in Figure 9. However, a solenoid 138 is mounted about the plunger 134 to draw that plunger to the left in Figure 9 and against the action of spring 136 upon current flow therethrough, thereby shifting the crank arm 122 in the counter-clockwise direction and operating switch 104 and the member 114.

The solenoid 138 is energized in time sequence to operate the crank 122 as required to cause the medium 44 to travel in one direction until the program recorded thereon is exhausted, and then to travel in the opposite direction to repeat the program. This is accomplished by the cam switch 140 which is in series connection with the battery 142 selectively to energize the solenoid 138. The switch 140 is in engaging relationship with the cam disk 144 which in turn is driven by the synchronous clock motor 146. Since the cam 114 causes the switch 140 to contact during half the time and hence causes the crank 122 to assume the position shown in Figure 9 half the time, the medium 44 is caused to travel in one direction during half the time and in the opposite direction during the other half of the time, and, simultaneously, due to the action of the switch 104, the heads 40*a* and 40*b* are selectively connected to the amplifier 38 in accord with the motion of the medium 44. The amplifier 38 thus produces electromotive force suitable for application to heads 36, Figure 3, without time periods required to rewind medium 44.

Alternatively, the switch 140 can be replaced by a toggle switch operable to open when struck in one direction and close when struck in the opposite direction. The cam 144 and motor 146 can be replaced by elements which move in accord with the linear movement of medium 44 and have projections which engage the toggle switch when the ends of medium 44 are approached.

While I have shown and described only an illustrative continuously operative mechanism for use with the reels 46 and 48, it will be evident that a similar mechanism is preferably applied also to the reels 62 and 64 to achieve continuous application of proper signals to heads 52, Figure 3.

Figures 12, 13, 14, 15, 16, 17:
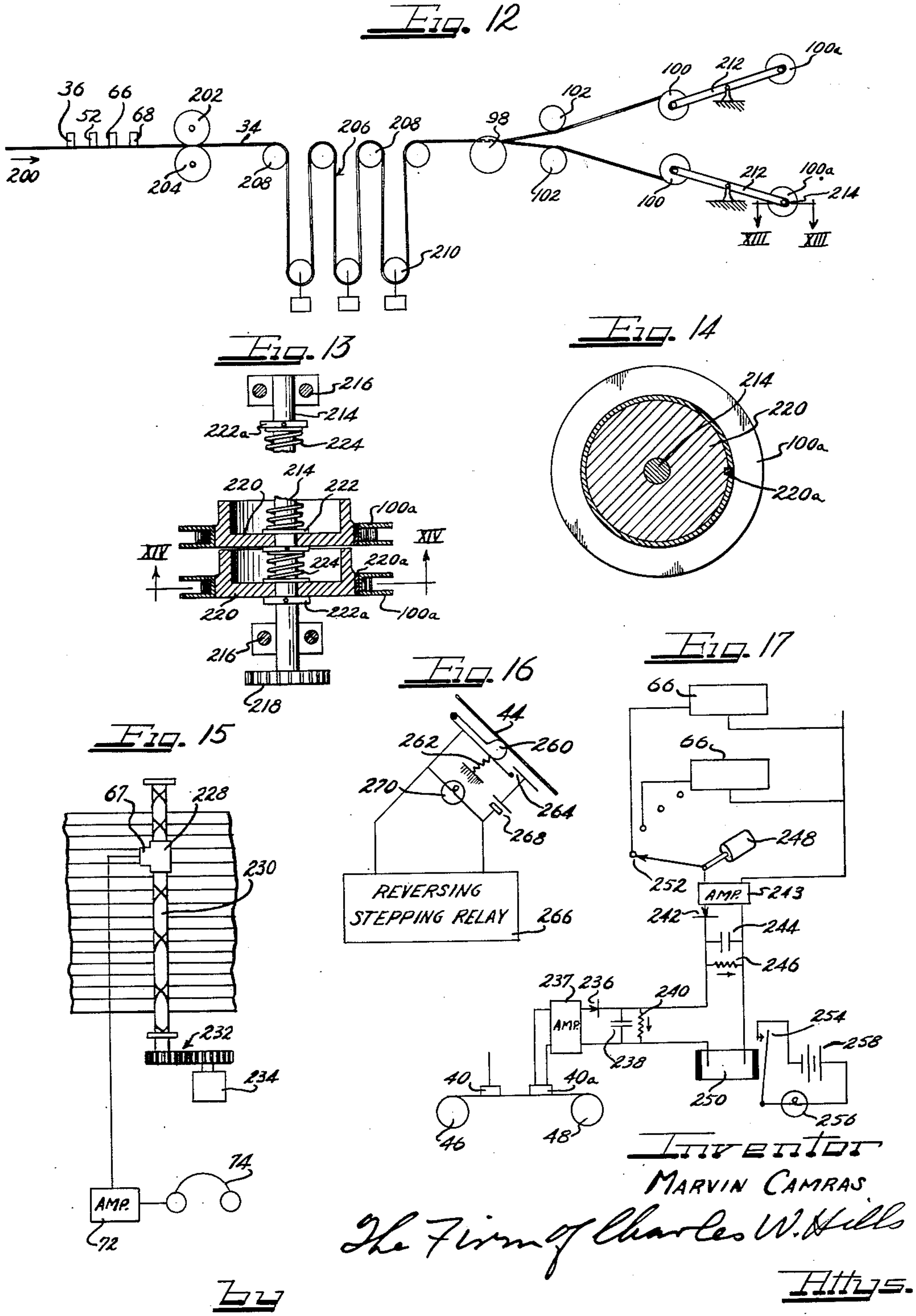
Figure 12 is a somewhat diagrammatic view similar to Figure 5 but showing an alternative embodiment of the present invention.
Figure 13 is a cross sectional view through the axis XIII—XIII, Figure 12 and showing parts in elevation.
Figure 14 is a cross sectional view through the axis XIV—XIV, Figure 13.
Figure 15 is a fragmentary view showing a portion of another embodiment of the monitor portion of the present invention.
Figure 16 is a fragmentary somewhat diagrammatic view of an alternative embodiment of a medium reversing mechanism for use with apparatus of the present invention.
Figure 17 is yet another embodiment of the monitor of the present invention.

Figure 12 shows in diagrammatic form still another embodiment of the present invention. As seen in this figure, the medium 34 travels in the direction of arrow 200 across the heads 36, 52, 66, and 68 to the capstan 202 and the pinch wheel 204. The medium 34 is held between these two wheels and there receives a constant velocity. Upon leaving the capstan 202, the medium travels to the slack take-up assembly 206. This assembly consists of a plurality of fixed guide pulleys 208 and a plurality of cooperating movable weighted pulleys 210. The medium 34 is looped over these pulleys so when the medium 34 is withdrawn from the last guide pulley 208 at a greater rate than it is released by the capstan 202, the weighted pulleys 210 rise to take up the difference in the quantities of medium. Conversely, the weighted idler pulleys 210 drop when the medium is withdrawn from the last guide pulley 208 at a smaller rate than it travels through the capstan 202.

After leaving the assembly 206, the medium travels to the shear 98 and then to the spaced pulleys 102 to be wound upon the take-up reels 100.

In order to provide continuous operation of the medium recording process, the structure of Figure 12 includes a pair of spaced turrets 212 which support the take-up reels 100 and which, in addition, have opposed arms supporting spare take-up reels 100*a*. When the reels 100 are filled with a recorded medium, the take-up mechanism is stopped and the turrets 212 are rotated over 180° to place the spare take-up reels 100*a* in the medium receiving position with the medium bearing against the core of the empty reels 100*a*. The medium may then be attached with adhesive tape or similar material to the cores of reels 100*a* and to the top of the filled reels 100. The medium may be cut and the take-up mechanism started to wind medium on reels 100*a*. During the time interval required for the change in take-up reels, the slack take-up mechanism 206 takes up the medium released from capstan 202, thus permitting the change over without discontinuing the recording operation.

The continuous operation achieved with a mechanism such as that of Figure 12 has the advantage that the medium 34 is continuously moved over the heads 36, 52, 66 and 68 at a constant velocity and there is no problem of accelerating and decelerating that medium. While it is relatively simple to impart to the medium 34 a constant velocity, by the use of capstan or similar arrangement, it is exceedingly difficult to impart controlled degrees of acceleration thereto such as would be required if that medium is stopped at intervals.

In addition, the continuous operation of the mechanism enables use thereof with a coating apparatus without the need for first coating the entire length of tape with a magnetizable layer. This is a consequence of the fact that a uniform layer cannot be achieved unless the medium travels through the coating equipment at uniform velocity.

Moreover, by continuously operating the recording mechanism, the output of the mechanism is increased, thereby reducing the fixed charges attributable to each unit of production.

In the cross sectional view of Figure 13, there is shown one form of the spool arrangement for use with the turrets, shown diagrammatically in Figure 12. As indicated, a common shaft 214 extends between the split bearings 216 which are sustained on the turret arm 212. The split bearings permit removal of shaft 214 to change the spools 220. This shaft bears the gear 218 at one end which is driven to impart take-up rotations to the spools 100*a* when these spools are in the operating position. This gear may, for example, coact with a fixed continuously rotated gear (not shown) positioned to be engaged thereby when the turret is located to shift the reels 100*a* to the operating position. Intermediate between the split bearings 216, the shaft 214 sustains a plurality of collars 220 each of which receives a reel 100*a* on its outer periphery and includes a suitable keyway to receive keys 220*a* which drive these reels. Each collar 220 is loosely mounted on the shaft 214 to permit slipping engagement therewith. A frictional engagement between the shaft 214 and the collars 220 is provided by the washers 222 each of which is splined to permit shifting movements of these collars while rotating the same with shaft 214. The end washers 222*a* are held to shaft 214 by cotter pins as shown and springs 224 are disposed intermediate the adjacent collars 220 to urge the washers 222 into frictional engagement with the web portions thereof.

Figure 14 is a cross sectional view through axis XIV—XIV, Figure 13, showing a reel 100*a*, the collar 220, shaft 214 and a key 220*a* which is received between suitable axial grooves in the reel 100*a* and the collar 220 to achieve a positive driving engagement therebetween.

It will be evident that as the gear 218, Figure 13, is driven to tend to rotate the reels 100*a* in the take-up direction, the medium 34, Figure 12, tends to be wound thereon. This maintains that medium taut, and winds the medium on the reels 100*a*.

To achieve continuous production of magnetized records, the gear 218 is rotated at a speed sufficient to take-up the medium 34 at a greater rate than capstan 202 releases that medium, thereby making up for the excess medium released during this time period when the turrets 212 are being changed. The slack take-up mechanism 206 then acts as a medium storing device to take up excess medium while the reels are being changed and to release that medium during the intervening time periods.

Figure 15 shows an alternative embodiment of the monitoring arrangement shown in Figure 3. As indicated, a single monitoring head 67 is disposed on the housing 228 which has a cylindrical opening and suitable cam follower to receive the level wind screw 230. This screw is rotated through the gear train 232 by the motor 234 to cause it to execute successive motions across the width of medium 34. Thus the head 67 automatically travels from one track to another and the entire surface of the medium 34 is monitored automatically. The gear train may, if desired, include an intermittent operating device such as a Geneva gear (not shown) to cause successive movements of the screw 230 to cause head 67 to travel successively from one channel of medium 34 to another.

In Figure 16 there is shown an alternative method of achieving reversing movements of the mechanism of Figure 9. As shown, a movable tongue 260 rides against the medium 44 and when an opening or window in that medium is aligned with the tongue 260, the latter swings into that window under the bias of compression spring 262, thereby closing the contacts 264. The reversing stepping relay 266 is connected in series relationship with battery 268 and the contacts 264 to be energized when the tongue 260 rides in a window or opening in the medium 44. In addition, a lamp 270 is energized to indicate the fact that the reversing operation is taking place.

The reversing stepping relay 266 may be any one of several types well known in the art. In one construction, for example, a ratchet is arranged for coacting relationship with a solenoid so that when the solenoid is energized the ratchet swings a ratchet wheel a predetermined angular increment and, upon deenergization of the stepping relay, is driven back by spring means preparatory to another stroke. The relay is provided with suitable circuit connections so that upon each successive stroke, the crank arm 122, Figure 9, is rotated to cause medium 44 to travel in opposite direction and to connect head 40*a* or 40*b* to amplifier 38 as required.

From the foregoing it will be evident that with the mechanism of Figure 16 the same continuous and automatic operation achieved in the mechanism of Figure 9 is provided and, in addition, the possibility of cumulative errors associated with small lack of synchronism is avoided.

Figure 17 is the circuit diagram of an alternative automatic monitoring system for use with the mechanism of the present invention. As shown in this figure, the voltage of head 40*a* is applied to rectifier 236 to charge the capacitor 238. The capacitor 238 is shunted by the resistance 240 to cause the voltage thereacross to correspond with the envelop of the voltage output of head 40. Similarly, the output appearing across the winding of the selected head 66 is applied to rectifier 242 which charges capacitor 144. This capacitor is shunted by resistance 246 to cause the voltage thereacross to be of value corresponding with the envelop of the induced voltage in the winding of head 66. Resistances 240 and 246 are connected in series connection with relay winding 250 so that the voltages associated with the operation of rectifiers 236 and 242 are in opposition. When relay 250 is energized, the contacts 254 are closed and indicating lamp 256 is energized by battery 258. Amplifiers 237 and 243 are interposed between heads 40*a* and 66 to increase the energy level of the induced voltages to a value capable of operating relay 250.

When the magnitude of the induced voltage in head 66, corresponding to the recorded intelligence on one track of the record medium 34, is in accord with the output voltage of head 40, the difference in the voltages across resistances 240 and 246 is insufficient to energize the relay winding 250 and the contacts 254 remain open. However, if for any reason the level of the recorded intelligence on the track of which head 66 operates, is too great or too small, as compared to the intelligence to be recorded, a net voltage appears across the relay winding 250 and the relay contacts 254 are closed to give the visible signal by light 256.

It will be apparent that the apparatus of Figure 17 automatically indicates the quality of the recording on the channel of which the selected head 66 rides. This is accomplished without the intervention of an operator and without the need for the operator's skilled observation of the character of the recording. Thus the operator is free to engage in other tests not related to the problem of monitoring. The switch 252 is continuously rotated by motor 248 automatically to change the selected head 66.

It will be apparent to those skilled in the art that a similar arrangement may be provided with head 68, Figure 3, thereby providing automatic monitoring of the reverse tracks as well as the forward track.

The head **40*a* is spaced relative to the head 40 to cause the induced voltage in the winding thereof to be delayed by approximately the time increment required for the medium 34, Figure 3, to travel from the head 36 to the head 66. Consequently, the induced voltage in the winding of head 40*a* is in approximate time phase with the induced voltage in the head 66** and may be compared therewith to determine the fidelity of recording.

It will be further evident to those skilled in the art that the various heads 36, 52, etc, may be combined in single heads extending across medium 34. Suitable keepers similar to keeper 32, Figure 2, may then be used to prevent recording on alternate channels.

While the foregoing specification and the accompanying claims refer to continuous production of records, it will, of course, be understood that each successive record is spaced from the adjacent records by a length of medium as, for example, two feet. This length allows for errors in cutting the medium and, in addition provides a leader portion for inserting the medium in the reproducer. The time varying current flow in the recording heads is thus caused to vary with the successive programs separated by intervening short time intervals corresponding to the desired leader lengths.

In the foregoing specification I have described my invention as used to magnetize a record medium along adjacent channels with the intelligence extending therealong in opposite directions. It will, of course, be evident that the features thereof are also generally applicable to mechanisms for recording different intelligences along adjacent channels of a record medium such as, for example, the intelligences corresponding to separate portions of a stereophonic or binaural sound record.

While I have shown particular embodiments of my invention, it will of course be understood that I do not wish to be limited thereto since many modifications both in the circuit arrangement and in the structure disclosed may be made without departing from the spirit and scope of my invention. I, of course, contemplate by the appended claims to cover any such modifications as fall within the true spirit and scope of my invention.

I claim as my invention:

1. In an apparatus for reproducing a plurality of multichannel magnetic record mediums from a wide strip of magnetizable record medium having a plurality of longitudinal sections each corresponding to one medium, said mediums being of the type operable in magnetic recording and reproducing apparatus wherein the medium travels in one direction during one part of the program and in the opposite direction during another part of the program; a plurality of pairs of electromagnetic transducer heads arranged in rows extending transversely of said mediums, each of said rows including a plurality of transducer heads with the heads of each pair thereof being arranged in separate of said rows, means sustaining the heads of each pair to ride on first and second channels respectively of one of said sections respectively, the separate heads of each pair being spaced longitudinally relative to said medium so that the heads of each row are spaced at least one channel from adjacent heads in the row; a first master record having said one part of said program recorded thereon; mechanism to cause current flow in one head of each of said pairs in accordance with the time variations of the intelligence recorded on said first master record; a second master record having said other part of said program recorded thereon in reverse order, and mechanism to cause current flow in the other head of each pair in accordance with the time variations of the reverse intelligence recorded on said second master record.

2. In apparatus for producing a plurality of multichannel magnetic record mediums from a wide strip of magnetizable record medium having a plurality of longitudinal sections each corresponding to one medium, said mediums being of the type operable in magnetic recording and reproducing apparatus wherein the medium travels in one direction during one part of the program and in the opposite direction during another part of the program; a plurality of pairs of electromagnetic transducer heads arranged in a pair of rows extending transversely of said mediums, each of said rows including one head of each of said pairs of heads, means sustaining the heads of each pair to ride on first and second channels respectively of one of said sections respectively, the separate heads of each pair being spaced longitudinally relative to the medium so that the heads of each row are spaced at least one channel from adjacent heads in the row; a first master record having said one part of said program recorded thereon; mechanism to cause current flow in one head of each of said pairs in accordance with the time variations of the intelligence recorded on said first master record; a second master record having said other part of said program recorded thereon in reverse order, and mechanism to cause current flow in the other head of each pair in accordance with the time variations of the reverse intelligence recorded on said second master record whereby the heads in one of said rows record in accordance with the time variations of the intelligence on one of said master records and the heads in the other row record in accordance with the time variations of the intelligence recorded on the other master record.

3. In an apparatus for producing a plurality of multichannel magnetic record mediums from a wide strip of magnetizable record medium having a plurality of longitudinal sections each corresponding to one medium, said mediums being of the type operable in magnetic recording and reproducing apparatus wherein the medium travels in one direction during one part of the program and in the opposite direction during another part of the program; a plurality of pairs of electromagnetic transducer heads arranged in pairs of rows extending transversely of said medium, each pair of rows including a plurality of pairs of heads with the heads of each pair thereof being arranged in separate of said rows; means sustaining the heads of each pair to ride on first and second channels respectively of one of said sections, the separate heads of each pair being spaced longitudinally to said medium so that the heads of each row are spaced at least one section from adjacent heads in the row; a first master record having said one part of said program recorded thereon; mechanism to cause current to flow in one head of each of said pairs in accordance with the time variations of the intelligence recorded on said first master record; a second master record having said other part of said program recorded thereon in reverse order, and mechanism to cause current flow in the other head of each pair in accordance with the time variations of the reverse intelligence recorded on said second master record.

4. In an apparatus for reproducing a plurality of multichannel magnetic record mediums from a wide strip of magnetizable record medium having a plurality of longitudinal sections each corresponding to one medium, said mediums being of the type operable in magnetic recording and reproducing apparatus wherein the medium travels in one direction during one part of the program and in the opposite direction during another part of the program; a plurality of pairs of electromagnetic transducer heads arranged in rows extending transversely of said mediums, each of said rows including a plurality of transducer heads with the heads of each pair thereof being arranged in separate of said rows, means sustaining the heads of each pair to ride on first and second channels respectively of one of said sections respectively, the separate heads of each pair being spaced longitudinally relative to said medium so that the heads of each row are spaced at least one channel from adjacent heads in the row; a first master record having said one part of said program recorded thereon; mechanism to cause current flow in one head of each of said pairs in accordance with the time variations of the intelligence recorded on said first master record; a second master record having said other part of said program recorded thereon in reverse order, and mechanism to cause current flow in the other head of each pair in accordance with the time variations of the reverse intelligence recorded on said second master record; and means to separate said mediums following passage thereof under said electromagnetic transducer heads.

5. In an apparatus for reproducing a plurality of multichannel magnetic record mediums from a wide strip of magnetizable record medium having a plurality of longitudinal sections each corresponding to one medium, said mediums being of the type operable in magnetic recording and reproducing apparatus wherein the medium travels in one direction during one part of the program and in the opposite direction during another part of the program; a plurality of pairs of electromagnetic transducer heads arranged in rows extending transversely of said mediums, each of said rows including a plurality of transducer heads with the heads of each pair thereof being arranged in separate of said rows, means sustaining the heads of each pair to ride on first and second channels respectively of one of said sections respectively, the separate heads of each pair being spaced longitudinally relative to said medium so that the heads of each row are spaced at least one channel from adjacent heads in the row; a first master record having said one part of said program recorded thereon; mechanism to cause current flow in one head of each of said pairs in accordance with the time variations of the intelligence recorded on said first master record; a second master record having said other part of said program recorded thereon in reverse order, and mechanism to cause current flow in the other head of each pair in accordance with the time variations of the reverse intelligence recorded on said second master record; and means to separate said mediums preceding passage thereof under said electromagnetic transducer heads.

References Cited in the file of this patent

UNITED STATES PATENTS

| | | |
|---|---|---|
| 773,985 | Ries | Nov. 1, 1904 |
| 1,109,917 | Gall | Sept. 8, 1914 |
| 1,653,467 | O'Neill | Dec. 20, 1927 |
| 1,975,929 | Eldred | Oct. 9, 1934 |
| 1,989,965 | Beverage | Feb. 5, 1935 |
| 2,002,151 | Maurer | May 21, 1935 |
| 2,029,979 | Bernheim | Feb. 4, 1936 |
| 2,038,647 | Clausen | Apr. 28, 1936 |
| 2,213,246 | Heller | Sept. 3, 1940 |
| 2,213,631 | Heller | Sept. 3, 1940 |
| 2,254,034 | Fletcher | Aug. 26, 1941 |
| 2,328,539 | Greenleaf | Sept. 7, 1943 |
| 2,357,389 | Ferm | Sept. 5, 1944 |
| 2,422,143 | Somers | June 10, 1947 |
| 2,431,540 | Camras | Nov. 25, 1947 |
| 2,431,541 | Camras | Nov. 25, 1947 |
| 2,433,207 | Eilenberger | Dec. 23, 1947 |

FOREIGN PATENTS

| | | |
|---|---|---|
| 197,028 | Switzerland | July 16, 1938 |
| 316,654 | Great Britain | Aug. 29, 1929 |
| 701,552 | Germany | Jan. 18, 1941 |